US012605683B1

(12) United States Patent
Cupp

(10) Patent No.: US 12,605,683 B1
(45) Date of Patent: Apr. 21, 2026

(54) FLUID-STIRRING ACCESSORY FOR USE WITH A DRINKING VESSEL

(71) Applicant: John Cupp, Cramerton, NC (US)

(72) Inventor: John Cupp, Cramerton, NC (US)

( * ) Notice: Subject to any disclaimer, the term of this patent is extended or adjusted under 35 U.S.C. 154(b) by 809 days.

(21) Appl. No.: 17/972,715

(22) Filed: Oct. 25, 2022

Related U.S. Application Data

(60) Provisional application No. 63/341,918, filed on May 13, 2022.

(51) Int. Cl.
*B01F 33/452* (2022.01)
*B01F 33/501* (2022.01)
*B01F 101/14* (2022.01)

(52) U.S. Cl.
CPC ...... *B01F 33/50111* (2022.01); *B01F 33/452* (2022.01); *B01F 2101/14* (2022.01)

(58) Field of Classification Search
CPC .. B01F 33/45; B01F 33/453; B01F 33/50111; B01F 33/452; B01F 2101/14
See application file for complete search history.

(56) References Cited

U.S. PATENT DOCUMENTS

| | | | |
|---|---|---|---|
| 4,911,556 A | 3/1990 | Lim | |
| 6,719,451 B1 | 4/2004 | Yue | |
| D767,938 S | 10/2016 | Picozza | |
| 9,549,639 B2 | 1/2017 | Garr | |
| 9,670,448 B2 * | 6/2017 | Zeuch | B01F 33/453 |
| 10,517,438 B2 * | 12/2019 | Walker | A47J 43/0465 |
| 10,864,490 B1 | 12/2020 | Zolorzano | |
| 11,123,699 B1 | 9/2021 | Gilman | |
| 2005/0135186 A1 | 6/2005 | Mbakop | |
| 2006/0158958 A1 | 7/2006 | Romanik | |
| 2017/0318995 A1 | 11/2017 | Rai | |

FOREIGN PATENT DOCUMENTS

| | | |
|---|---|---|
| WO | 2016003937 | 1/2016 |

* cited by examiner

*Primary Examiner* — Elizabeth Insler

(74) *Attorney, Agent, or Firm* — Kyle A. Fletcher, Esq.

(57) ABSTRACT

The fluid-stirring accessory for use with a drinking vessel is configured for use with a drinking vessel that is adapted for use in storing a fluid. The fluid-stirring accessory for use with a drinking vessel mounts on the drinking vessel. The fluid-stirring accessory for use with a drinking vessel forms an apparatus that generates an angular momentum that is transferred to the fluid stored in the drinking vessel. The fluid-stirring accessory for use with a drinking vessel comprises an outer ring, an inner ring, and the drinking vessel. The outer ring mounts on the exterior lateral face of the drinking vessel. The inner ring mounts on the interior lateral face of the drinking vessel.

5 Claims, 5 Drawing Sheets

FLUID-STIRRING ACCESSORY FOR USE WITH A DRINKING VESSEL

CROSS REFERENCES TO RELATED APPLICATIONS

This non-provisional patent application claims priority to provisional patent application 63/341,918 that was filed by the applicant on May 23, 2022.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of machines for domestic use not covered elsewhere. (A47J43/0465)

SUMMARY OF INVENTION

The fluid-stirring accessory for use with a drinking vessel is configured for use with a cup. The cup is a drinking vessel that is adapted for use in storing a consumable fluid. The fluid-stirring accessory for use with a drinking vessel mounts on the drinking vessel. The fluid-stirring accessory for use with a drinking vessel forms an apparatus that generates an angular momentum that is transferred to the consumable fluid stored in the drinking vessel. The fluid-stirring accessory for use with a drinking vessel comprises an outer ring, an inner ring, and the drinking vessel. The outer ring mounts on the exterior lateral face of the drinking vessel. The inner ring mounts on the interior lateral face of the drinking vessel.

These together with additional objects, features, and advantages of the fluid-stirring accessory for use with a drinking vessel will be readily apparent to those of ordinary skill in the art upon reading the following detailed description of the presently preferred, but nonetheless illustrative, embodiments when taken in conjunction with the accompanying drawings.

In this respect, before explaining the current embodiments of the fluid-stirring accessory for use with a drinking vessel in detail, it is to be understood that the fluid-stirring accessory for use with a drinking vessel is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fluid-stirring accessory for use with a drinking vessel.

It is therefore important that the claims be regarded as including such equivalent construction insofar as they do not depart from the spirit and scope of the fluid-stirring accessory for use with a drinking vessel. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
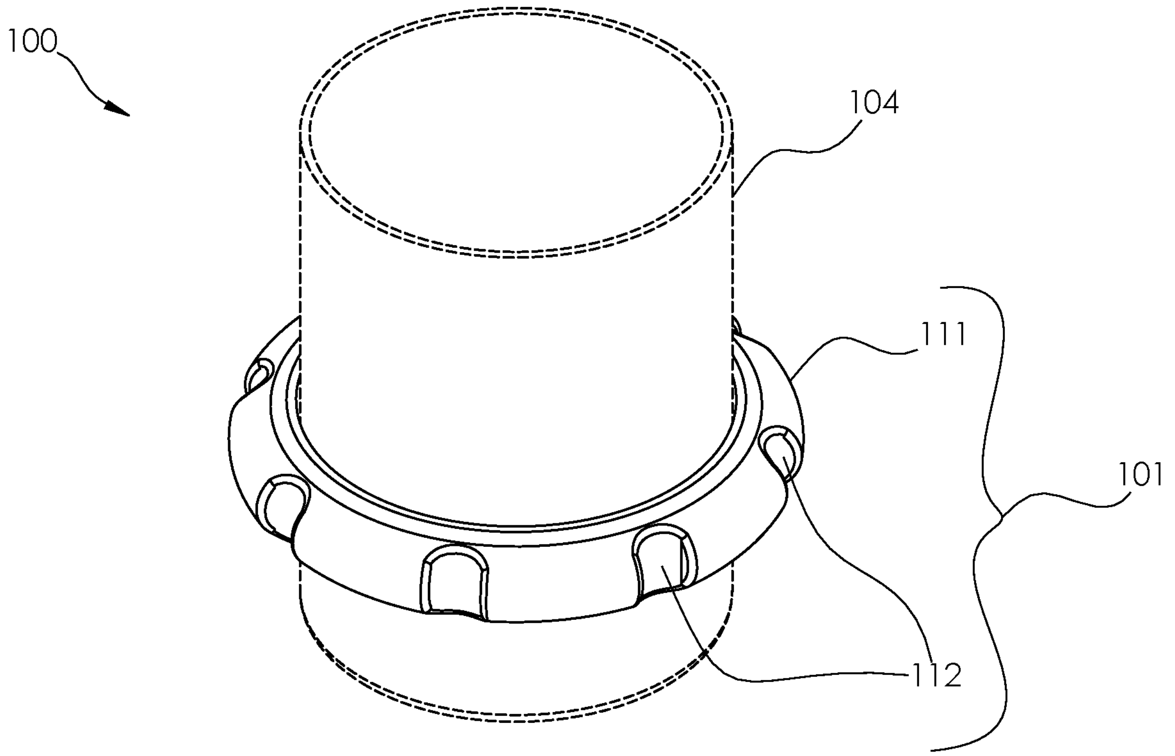
FIG. 1 is a perspective view of an embodiment of the disclosure.
Figure 2:
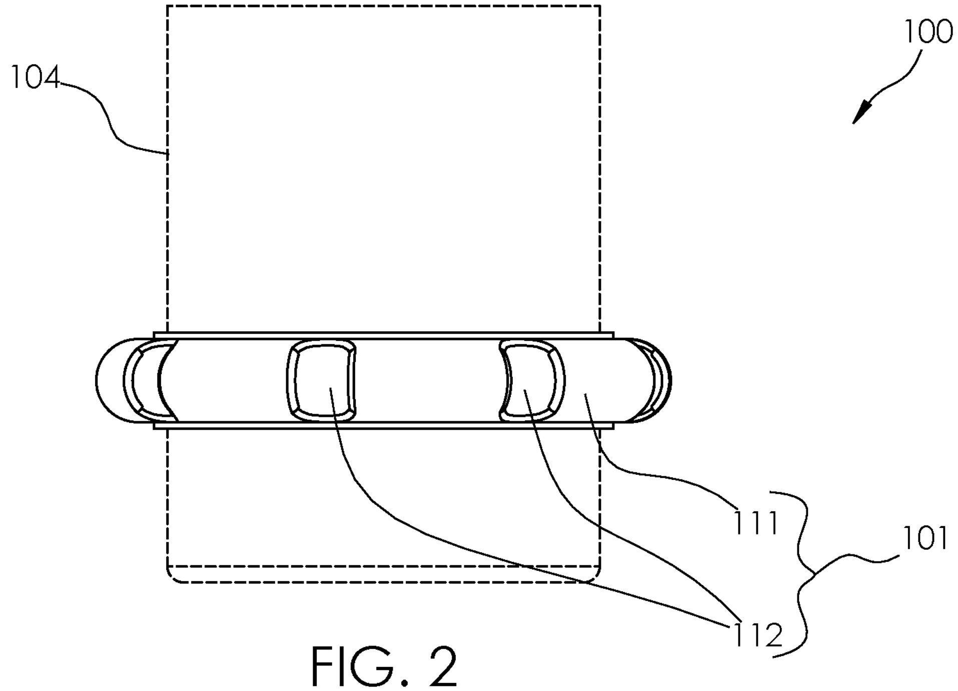
FIG. 2 is a front view of an embodiment of the disclosure.
Figure 3:
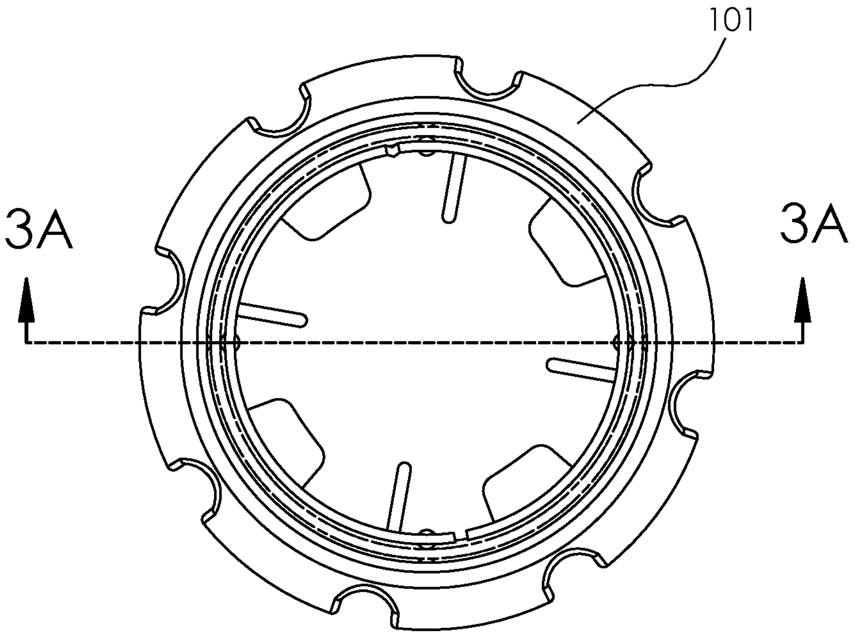
FIG. 3 is a top view of an embodiment of the disclosure.
Figure 3A:
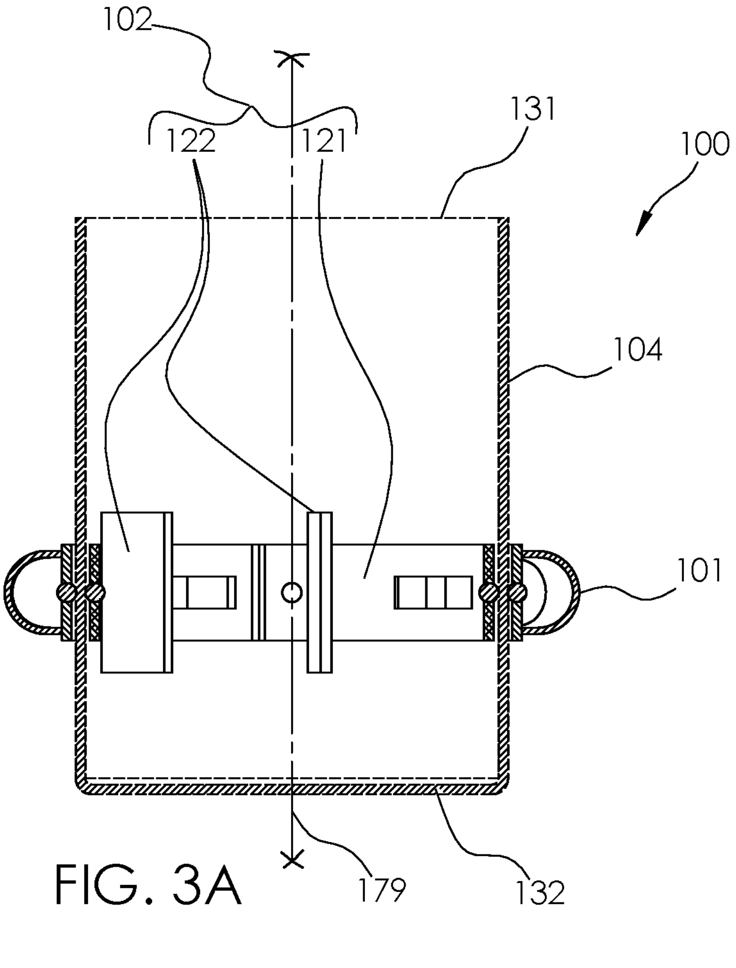
FIG. 3A is a cross-sectional view of an embodiment of the disclosure across 3A-3A as shown in FIG. 3.
Figure 4:
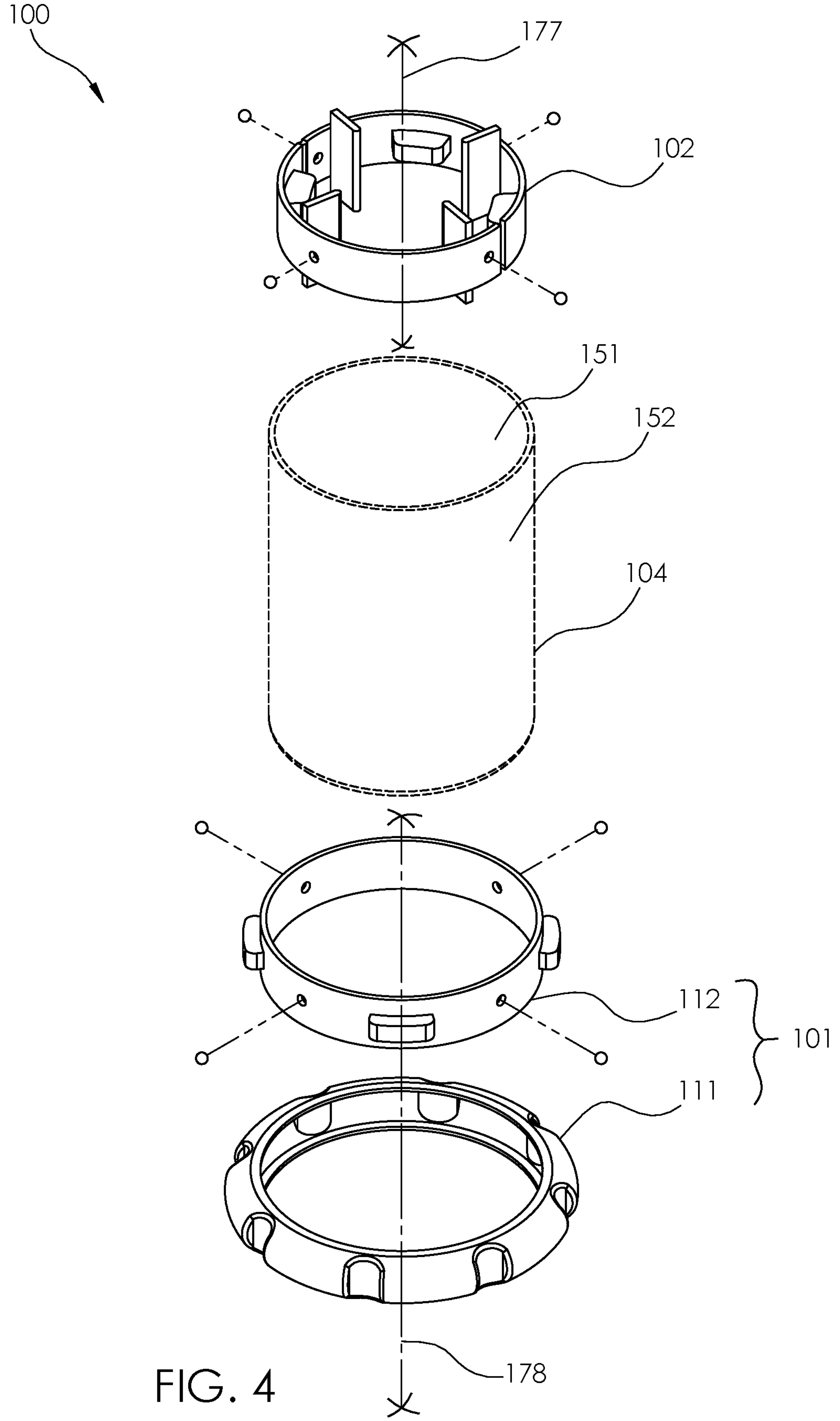
FIG. 4 is an exploded view of an embodiment of the disclosure.
Figure 5:
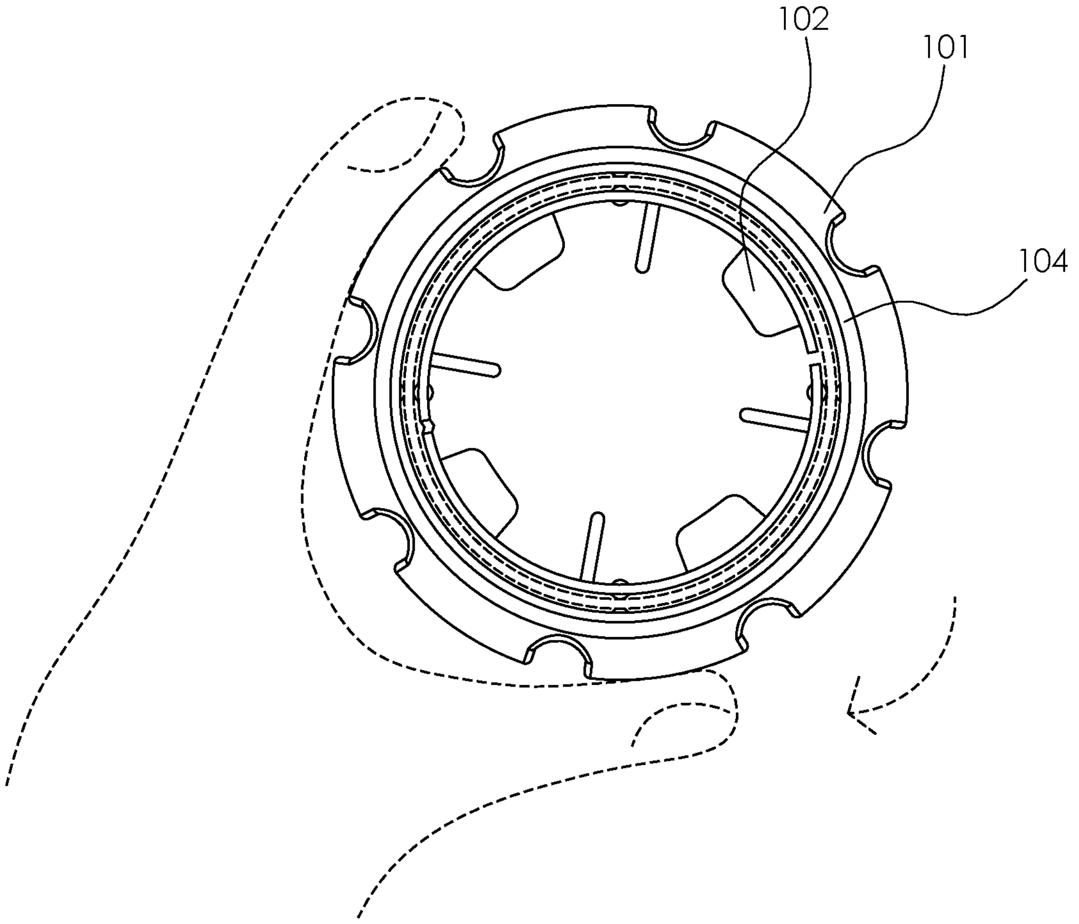
FIG. 5 is an in-use view of an embodiment of the disclosure.
Figure 6:
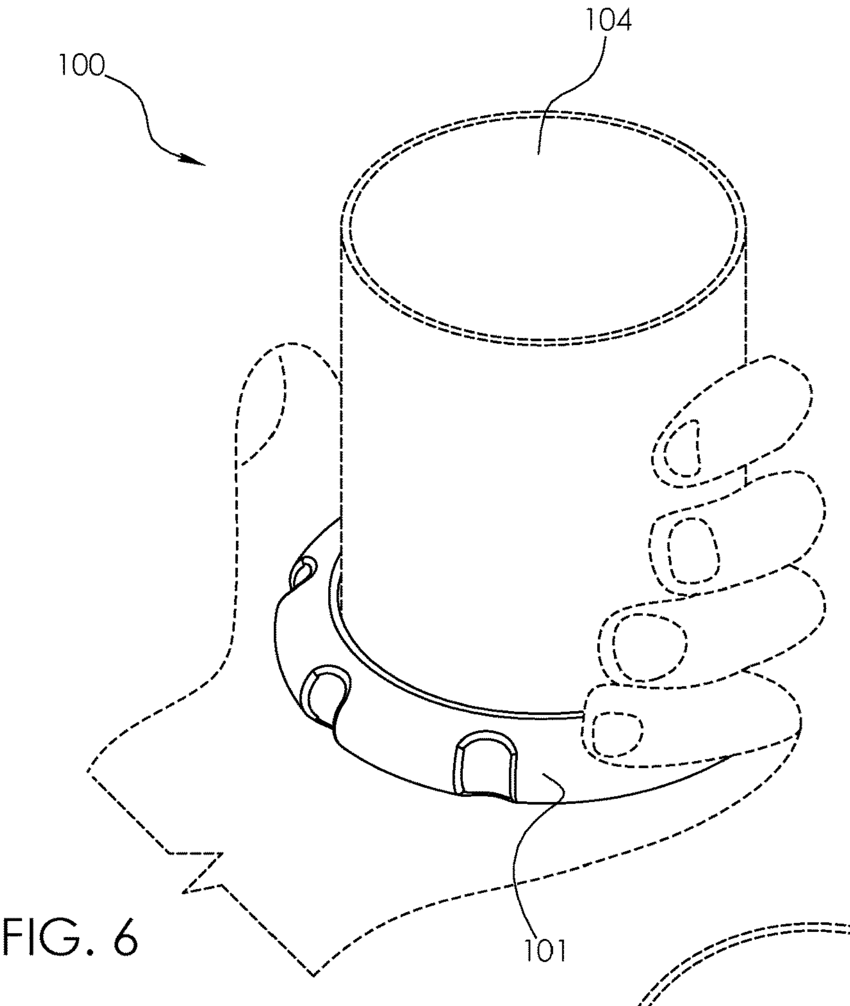
FIG. 6 is an in-use view of an embodiment of the disclosure.
Figure 7:
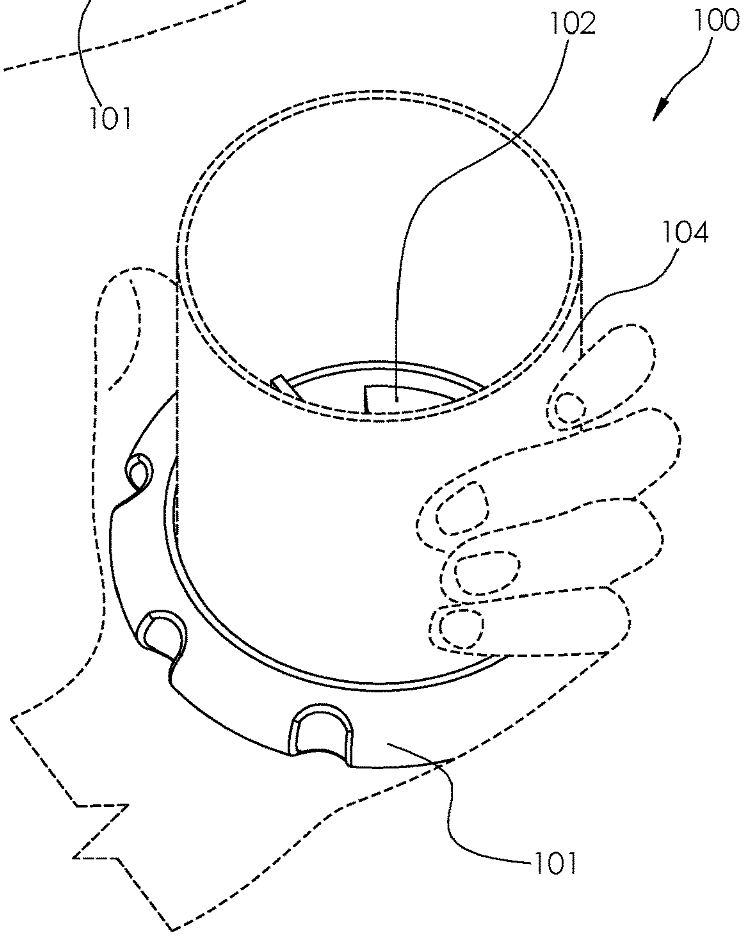
FIG. 7 is an in-use view of an embodiment of the disclosure.

Detailed reference will now be made to one or more potential embodiments of the disclosure, which are illustrated in FIGS. 1 through 7.

The fluid-stirring accessory for use with a drinking vessel 100 (hereinafter invention) is configured for use with a cup. The cup is a drinking vessel 104 that is adapted for use in storing a consumable fluid. The invention 100 mounts on the drinking vessel 104. The invention 100 forms an apparatus that generates an angular momentum that is transferred to the consumable fluid stored in the drinking vessel 104. The invention 100 comprises an outer ring 111 structure 101, an inner ring 121 structure 102, and the drinking vessel 104. The drinking vessel 104 further comprises an exterior lateral face 151 and an interior lateral face 152. The rolling element bearing 111 structure 101 mounts on the exterior lateral face 151 of the drinking vessel 104. The inner ring 121 structure 102 mounts on the interior lateral face 152 of the drinking vessel 104.

The drinking vessel 104 is a prism shaped structure. The drinking vessel 104 is formed with a prism shape. The drinking vessel 104 is formed as a pan. The drinking vessel 104 inserts into the outer ring 111 structure 101 such that the rotation of the outer ring 111 structure 101 rotates the inner ring 121 structure 102 contained in the drinking vessel 104. The inner ring 121 structure 102 rotates the consumable fluid contained in the drinking vessel 104 around a first axis of rotation 177 that aligns with a center axis 179 of the drinking vessel 104. The rotation of the inner ring 121 structure 102 transfers an angular momentum to the consumable fluid contained in the drinking vessel 104 which stirs the consumable fluid within the drinking vessel 104.

The outer ring 111 structure 101 is a rotating structure. The outer ring 111 structure 101 is a ring shaped structure. The outer ring 111 structure 101 mounts on the exterior lateral face 151 of the drinking vessel 104. The outer ring 111 structure 101 mounts on the drinking vessel 104 to form a composite prism structure.

The outer ring 111 structure 101 is a rotating structure. The outer ring 111 structure 101 magnetically attaches to the inner ring 111 structure 102 such that a second axis of rotation 178 of the outer ring 111 structure 101 aligns with the first axis of rotation 177 of inner ring 111 structure 102. The outer ring 111 structure 101 and the inner ring 111 structure 102 sandwich the drinking vessel 104 such that the outer ring 111 structure 101, the inner ring 111 structure 102, and the drinking vessel 104 combine to form a composite prism structure.

The outer ring 111 structure 101 is a magnetic structure. The rotation of the outer ring 111 structure 101 rotates the magnetic field formed by the magnetic structure of the outer ring 111 structure 101.

The outer ring 111 structure 101 comprises an outer ring 111 and an outer plurality of magnets 112.

The outer ring 111 is a rolling element bearing. The outer ring 111 has a disk structure. The outer ring 111 has a ring structure. The outer ring 111 mounts on the exterior lateral face 151 of the drinking vessel 104. The outer ring 111 is a rotating structure that revolves around the drinking vessel 104. The outer ring 111 mounts on the drinking vessel 104 such that the outer ring 111 rotates around a center of axis that aligns with the center axis 179 of the drinking vessel 104.

Each magnet selected from the outer plurality of magnets is a magnet that mounts on the outer ring 111. The outer plurality of magnets 112 attaches to the outer ring 111 to form a grip structure used to rotate the outer ring 111 around the drinking vessel 104. The outer plurality of magnets 112 generates a magnetic field. The rotation of the outer plurality of magnets 112 by the outer ring 111 generates a changing magnetic field around the drinking vessel 104.

The inner ring 121 structure 102 is a rotating structure. The inner ring 121 structure 102 is a ring shaped structure. The inner ring 121 structure 102 attaches to the interior lateral face 152 of the drinking vessel 104. The inner ring 121 structure 102 attaches to the drinking vessel 104 to form a composite prism structure.

The inner ring 121 structure 102 is a rotating structure. The inner ring 121 structure 102 inserts into the drinking vessel 104 such that the first axis of rotation 177 of the inner ring 121 structure 102 aligns with a center axis 179 of the drinking vessel 104 formed by the attachment of the inner ring 121 structure 102 to the drinking vessel 104.

The inner ring 121 structure 102 is a magnetic structure. The magnetic field formed by the inner ring 121 structure 102 interacts with the magnetic field formed by the outer plurality of magnets 112 of the outer ring 111 structure 101. The interaction of the magnetic fields of the inner ring 121 structure 102 and the outer ring 111 structure 101 causes the inner ring 121 structure 102 to rotate when the outer ring 111 structure 101 is rotated.

The inner ring 121 structure 102 inserts into the drinking vessel 104. The inner ring 121 structure 102 is geometrically similar to the hollow interior of the drinking vessel 104. The inner ring 121 structure 102 inserts into the drinking vessel 104 to the depth where the outer dimension of the inner ring 121 structure 102 equals the inner dimension of the drinking vessel 104 such that friction will hold the inner ring 121 structure in a fixed position within the drinking vessel 104. The rotation of the inner ring 121 structure 102 within the drinking vessel 104 rotates the consumable fluid contained within the drinking vessel 104. The rotation of the inner ring 121 structure 102 transfers an angular momentum to the consumable fluid contained in the drinking vessel 104 which effectively stirs the consumable fluid contained within the drinking vessel 104.

The inner ring 121 structure 102 comprises an inner ring and an inner plurality of magnets 122.

The inner ring 121 is a rolling element bearing. The inner ring 121 has a disk structure. The inner ring 121 has a ring structure. The inner ring 121 is a rotating structure that revolves around the interior lateral face 152 of the drinking vessel 104. The inner ring 121 attaches to the drinking vessel 104 such that the inner ring 121 rotates around a center of axis that aligns with the center axis of the drinking vessel 104.

Each magnet selected from the inner plurality of magnets 122 is a magnet that mounts on the inner ring 121. The inner plurality of magnets 122 attaches to the inner ring 121. The inner plurality of magnets 122 forms a mechanical structure that rotates the consumable fluid contained in the drinking vessel 104 around a first axis of rotation 177 that aligns with the center axis of the drinking vessel 104.

The inner ring 121 structure 102 removably attaches to the interior lateral face 151 of the drinking vessel 104. The inner plurality of magnets 122 generates a magnetic field. The magnetic field generated by the inner plurality of magnets 122 magnetically secures the outer ring 111 structure 101 to the exterior lateral face 151 of the drinking vessel 104. The magnetic field generated by the inner plurality of magnets 122 interacts with the rotating magnetic field formed by the rotation of the outer plurality of magnets 112 such that the inner plurality of magnets 122 "chases" the rotating magnetic field generated by the rotation of the outer plurality of magnets 112 around the drinking vessel 104. The rotation of the inner plurality of magnets 122 within the changing magnetic field generated by the outer plurality of magnets 112 in turn rotates the inner ring 121 which provides the motive forces necessary to rotate the consumable fluid within the drinking vessel 104.

It shall be noted that both the inner ring 121 and the outer ring 111 may be used with our without bearings. Moreover, the claims below will not include bearings so as not to limit the scope of this patent application.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Ball Bearing: As used in this disclosure, a ball bearing is a spherical structure. One of the used of ball bearings is to form the rotating structure of rolling element bearings.

Barrier: As used in this disclosure, a barrier is a physical obstacle that forms a boundary between a first space and a second space. The barrier prevents the passage of an object between the first space and the second space.

Bearing: As used in this disclosure, a bearing is a mechanical device that: 1) guides and limits the motion of a moving component relative to a fixed component; and, 2) reduces the friction between the moving component and the fixed component. A locking bearing is a bearing that can be locked such that the rotation of movements secured into a fixed position until the locking bearing is subsequently unlocked. The use of bearings is well known and documented in the mechanical arts.

Capped Tube: As used in this disclosure, a capped tube is a tube with one closed end and one open end.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Cup: As used in this disclosure, a cup is a container that is intended to contain a fluid. The cup has a shape that roughly corresponds to a pan. Glass, mug, stein, and tumbler are a synonyms for a cup.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field. A magnet is further defined with a north pole and a south pole. By aligning with an external magnetic field is meant that the north-south pole structure of a first magnet will align with the north south pole of a second magnet. The pole of any first magnet will attract the opposite pole of any second magnet (i.e. a north pole will attract a south pole).

Major and Minor Axes: As used in this disclosure, the major and minor axes refer to a pair of perpendicular axes that are defined within a structure. The length of the major axis is always greater than or equal to the length of the minor axis. The major axis is always the longest diameter of the of the perimetrical boundary of the structure. The major and minor axes intersect at the center of the perimetrical boundary of the structure. The major axis is always parallel to the longest edge of a rectangular structure.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Prism Structure: As used in this disclosure, a prism structure is a modified prism structure that is formed such that the first congruent end of the modified prism structure is geometrically similar to, but not geometrically identical to the second congruent end of the modified prism. The span of length of a radial line from the center axis to the lateral face of the modified prism structure will vary as a function of its position along the center axis.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Radial: As used in this disclosure, the term radial refers to a direction that: 1) is perpendicular to an identified central axis; or, 2) projects away from a center point.

Rigid Structure: As used in this disclosure, a rigid structure is a solid structure formed from an inelastic material that resists changes in shape. A rigid structure will permanently deform as it fails under a force. See bimodal flexible structure.

Ring: As used in this disclosure, a ring is a term that is used to describe a disk-like structure through which a negative space is formed through the faces of the disk-like structure. Rings are often considered loops.

Rolling Element Bearing: As used in this disclosure, a rolling element bearing comprises is a type of bearing comprising an inner race, and outer race, and a plurality of ball bearings. The plurality of ball bearings are sphere shaped. The inner race is a circular ring. The outer race is a circular ring with an inner diameter that is greater than the outer diameter of the inner race. The plurality of ball bearings are placed between the inner race and the outer race such that: 1) the inner race and the outer race are coaxially positioned; and, 2) the inner race rotates relative to the outer race. Typically, the inner race attaches to a first object and the outer race attaches to a second object such that the first object rotates relative to the second object. Typically, a rolling element bearing is disk shaped. A rolling element bearing is said to be "locking" when the relative position of the inner race in be locked into a fixed position relative to the outer race.

Rotation: As used in this disclosure, rotation refers to the cyclic movement of an object around a fixed point or fixed axis. The verb of rotation is to rotate.

Sleeve: As used in this disclosure, a sleeve is a tube like covering that is placed over a prism (or prism like) structure.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Taper: As used in this disclosure, a taper is a continuous and typically, but not necessarily gradual, change in the span of the length of a structure in the direction parallel a direction selected from the group selected from the major axis and the minor axis of the structure. The change in the span of the length occurs as an apparent function of the measurement position along the unselected axis of the object.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A fluid-stirring accessory comprising
an outer ring, and an inner ring;
wherein the fluid-stirring accessory generates an angular momentum that is configured to be transferred to a consumable fluid stored in a drinking vessel;
wherein the outer ring is a ring shaped structure that is open, and contains no base;
wherein the outer ring is configured to mount onto or be removed from an exterior lateral face of the drinking vessel such that the outer ring and the drinking vessel is portable, and hand-held;
wherein the inner ring is a ring shaped structure that is open;
wherein the inner ring is configured to mount onto or be removed from an interior lateral face of the drinking vessel;
wherein both the outer ring and the inner ring is a rotating structure, and is able to rotate with respect to the drinking vessel;
wherein the inner ring and the outer ring are magnetically secured to one another;
wherein the outer ring is adapted to be rotated by fingers of an end user such that a rotation of the outer ring with respect to the drinking vessel rotates a magnetic field formed by an outer plurality of magnets of the outer ring;
wherein a magnetic field formed by a plurality of inner magnets of the inner ring interacts with the magnetic field formed by an outer plurality of magnets of the outer ring;
wherein the interaction of the magnetic fields of the inner ring and the outer ring causes the inner ring to follow a rotational movement of the outer ring when the outer ring is rotated thereby configured to stir the consumable drinking fluid contained within the drinking vessel.

2. The fluid-stirring accessory according to claim 1
wherein a first axis of rotation of the inner ring aligns with a center axis of the drinking vessel;
wherein a second axis of rotation of the outer ring aligns with the center axis of the drinking vessel.

3. The fluid-stirring accessory according to claim 2
wherein the inner ring is configured to insert into the drinking vessel;
wherein the rotation of the inner ring is configured to rotate the consumable fluid within the drinking vessel;
wherein the rotation of the inner ring is configured to transfer an angular momentum to the consumable fluid contained in the drinking vessel which effectively stirs the consumable fluid contained within the drinking vessel.

4. The fluid-stirring accessory according to claim 3
wherein the outer plurality of magnets generates a magnetic field;

wherein a rotation of the outer plurality of magnets around the drinking vessel by the outer ring generates a change in the magnetic field around the drinking vessel.

5. A fluid-stirring accessory comprising an outer ring, and an inner ring;

wherein both the outer ring and the inner ring are configured to mount and in a drinking vessel, respectively;

wherein the fluid-stirring accessory generates an angular momentum that is configured to be transferred to a consumable fluid stored in the drinking vessel;

wherein the outer ring is a ring shaped structure that is open, and contains no base;

wherein the outer ring is configured to mount onto or be removed from and rotate with respect to an exterior lateral face of the drinking vessel such that the outer ring and the drinking vessel is portable, and hand-held;

wherein the outer ring includes a rolling element bearing, which is configured to enable the outer ring to rotate with the exterior lateral face of the drinking vessel;

wherein the inner ring is a ring shaped structure that is open;

wherein the inner ring is configured to mount onto or be removed from and rotate with respect to an interior lateral face of the drinking vessel via a rolling element bearing of the inner ring;

wherein the inner ring and the outer ring are magnetically secured to one another;

wherein the outer ring is adapted to be rotated by fingers of an end user such that a rotation of the outer ring with respect to the drinking vessel rotates a magnetic field formed by an outer plurality of magnets of the outer ring;

wherein a magnetic field formed by a plurality of inner magnets of the inner ring interacts with the magnetic field formed by an outer plurality of magnets of the outer ring;

wherein the interaction of the magnetic fields of the inner ring and the outer ring causes the inner ring to follow a rotational movement of the outer ring when the outer ring is rotated thereby being configured to stir the consumable drinking fluid contained within the drinking vessel.

* * * * *